Jan. 19, 1965     A. SPRENZEL     3,166,027
DOUGH FORMING AND SIZING DEVICE
Filed Nov. 14, 1962
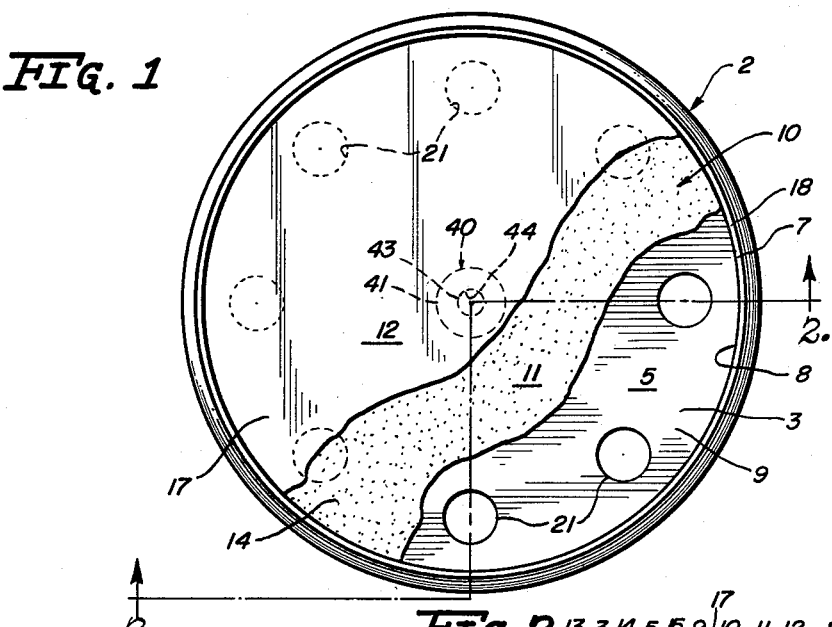
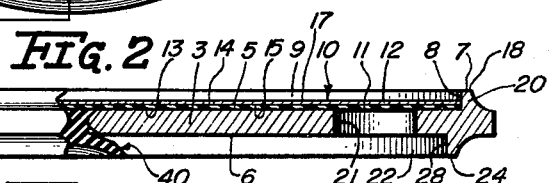
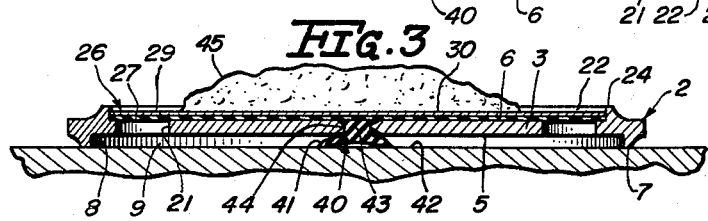
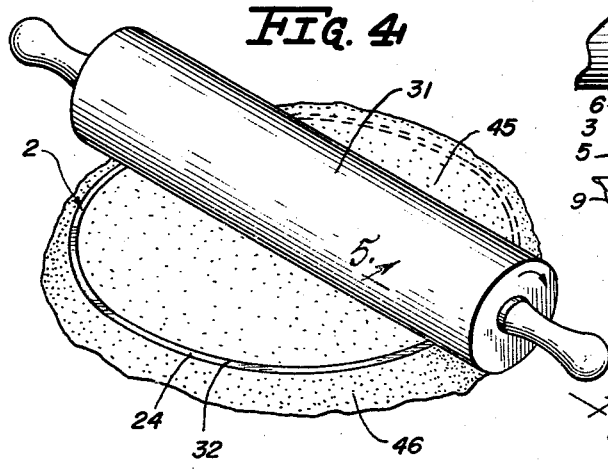
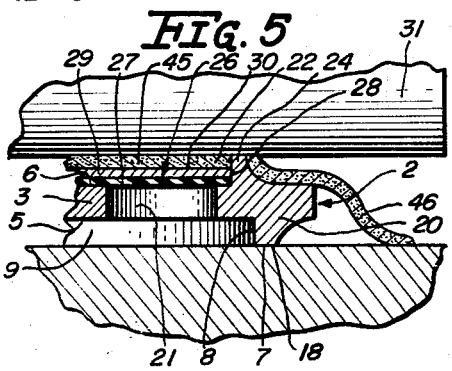
INVENTOR.
Adolph Sprenzel
BY
John J. Kowalik
Atty.

United States Patent Office 3,166,027
Patented Jan. 19, 1965

3,166,027
DOUGH FORMING AND SIZING DEVICE
Adolph Sprenzel, 2745 N. Mason Ave., Chicago, Ill.
Filed Nov. 14, 1962, Ser. No. 237,644
2 Claims. (Cl. 107—46)

This invention relates to the baking arts and more specifically to a pie dough making device.

In the making of many pastries, the dough is rolled into thin sheets and cut into appropriate forms. Experienced help is usually employed to obtain the required thickness consistent with sufficient production to make the operation profitable. In the making of pies the dough sheet is usually made larger than the baking plate and the excess is cut off.

It is a primary object of this invention to provide a novel sizing and dough forming device which will control the thickness of the dough and concomitantly with the dough being rolled cutting the excess to form a pie shell.

A more specific object of the invention is to provide a novel pie shell forming device which cooperates with a rolling pin or the like in kneading the dough.

A further object of the invention is to provide a novel pastry form which provides a dough rolling surface upon which the dough is rolled out with a rolling pin and which further provides a dough cut-off about the margins of the surface.

Another object is to provide a novel dough forming and sizing device which incorporates a resilient support and which is removable with the rolled sheet of dough to facilitate separation of the dough from the form.

A still further object is to provide a novel form having obverse and reverse sides for different size pies such as 9" and 12" and wherein the form comprises a cavity or recess in each side defined by an intermediate base plate with rims of different diameters about the periphery of the base.

Another object is to make the base such that the dough may be easily removed from the form and wherein to control the thickness of the dough shims are disposed upon the base to vary the depth of the recess and which serve as supports for the dough upon removal from the form.

The invention contemplates the provision of a novel form comprising an annular structure having different size rims extending axially outwardly from opposite sides of an intervening base which is apertured to provide finger holes through which the user may poke out from one side a shim plate assembly mounted upon the opposite side of the base to remove the dough sheet which had been rolled upon the shim plate assembly.

A corollary object is to provide in the shim plate assembly a novel flexible shim of elastomer material which is adapted to yield transversely or downwardly attendant to the rolling pin pressing the dough thereagainst to assist in kneading the dough against the rolling pin.

The invention also contemplates the provision of retainers for the form to prevent its slipping upon the work table, the retainers being in the form of suction cups insertable into apertures in the base of the form through the depression or recess which at the time is on the bottom side of the form and wherein the rim forms the support for the form against the work table and encompasses the retainers.

These and other objects and advantages inherent in and encompassed by the invention will become more readily apparent from the specifications and the drawings, wherein:

FIGURE 1 is a plan view with parts broken away of the novel invention taken from the obverse side thereof;

FIGURE 2 is an edge view partly in section taken substantially on line 2—2 of FIGURE 1;

FIGURE 3 is a radial sectional view with the structure shown in reverse position to that of FIGURES 1 and 2;

FIGURE 4 is a perspective view of the device with the dough rolled into a sheet and partly cut off; and FIGURE 5 is a fragmentary enlarged sectional view taken essentially on line 5—5 of FIGURE 4.

In the drawings there is shown a form or mold generally designated 2 which is an annular structure preferably, though not necessarily, formed of metal or plastic. The mold includes a flat intermediate base web or wall 3 having flat obverse and reverse sides 5 and 6. The side 5 is circumscribed by an axially extending annulus or rim 7 which has an interior cylindrical surface 8 which defines with the side 5 a mold cavity or recess 9 which snugly admits a shim plate assembly 10 of complementary form. In the present instance there are shown two shims 11 and 12, the lower one of which is preferably of resilient elastomer material such as natural or synthetic rubber. This elastic shim 11 is a flat circular sheet which has its bottom side 13 seated on top of the surface 5 and its top flat side 14 supporting and bearing against the bottom flat side 15 of the metal or plastic shim plate 12 which also is a circular flat plate fitting complementally within the cylindrical bore 8. The plate 12 provides a top flat surface 17 which is below the dough cut-off edge 18 of the rim 7. It will be realized that by varying of the thickness of the shims or by the addition or subtraction of shims the desired cavity depth is achieved.

The rim 7 has an outer tapered side and has a relatively narrow outer edge to facilitate cutting and a relatively wider inner portion 20 to provide a good union with the base 3.

The base 3 is provided with a plurality of transverse openings 21 therethrough which communicate between the obverse cavity 9 and the reverse cavity 22 so that the user may insert his fingers through these holes to remove the shims.

The reverse side of the form comprises an annulus or rim 24 circumscribing the reverse side 6 and forming therewith a mold cavity of recess 22 which is diametrically smaller than cavity 9. In the position of FIGURES 1 and 2 the rim 24 serves as a peripheral support for the form and in the position of FIGURE 3 admits the shim assembly 26 which comprises a bottom resilient flat plate or sheet 27 of elastomer material such as natural or synthetic rubber. This yieldable sheet is circular and complementally fits into the cylindrical bore surface 28 on the interior of the rim 24. The plate 27 supports a similar metal or plastic disc 29 which provides a flat outer dough support and working surface 30 upon which a ball of prepared dough is placed proximate the center and rolled by means of a rolling pin 31 which rolls along the cut-off edge 32 on the outer portion of rim 24 while kneading the dough against the shim assembly 26. The dough is rolled into a sheet and constantly pulled over the rim edge and then the excess is cut-off by rolling of the rolling pin riding over the dough against the edge 32.

The same procedure is followed in rolling of the dough on the opposite side of the form as just described when making a different size pie.

After the dough is rolled and cut off, the user inserts his or her finger through the finger holes 21 and dislodges the respective shim plate assembly and moves the same out of the respective cavity with the dough which is then removed from the outer plate.

In order to prevent the form from shifting about the work table there is provided a retainer means 40 which is herein shown as a resilient suction cup 41 which is adapted to adhere to the table surface 42, the suction cup being provided with a resilient mounting stud 43 which is deformed and inserted tightly into the central aperture 44. It will be noted that aperture 44 extends through the center plate 3 and that the retainer is removable and is insertable into the aperture 44 from either side of the structure.

The dough 45 is shown as a ball in FIGURE 3 and as rolled out in FIGURES 4 and 5 and the excess is shown at 46.

There having been described a preferred embodiment of the invention, it will be understood that variations will become readily suggested to those skilled in the art within the scope of the appended claims.

I claim:

1. In a device for sizing and shaping dough for making pies and the like, a form comprising an annular structure having a generally planar intermediate base portion and axially extending different diameter annular rims extending outwardly from opposite sides of the base portion and each providing a mold cavity and an outer cut-off and rolling pin guiding edge and each rim having a concave outer side and a dough supporting outer ring, and said base portion comprising finger holes therethrough, and shim means comprising at least one disc of elastomer material insertable into the mold cavities in covering relation to the holes and providing a dough working surface and a support for the rolled dough attendant to withdrawal from the device upon the operator prying the shim means out of the cavity through said finger holes.

2. The invention according to claim 1 and said shim means comprising at least one metallic plate overlying said elastomer disc.

References Cited by the Examiner

UNITED STATES PATENTS

| 212,257 | 2/79 | Norris | 285—177 X |
| 1,482,555 | 2/24 | Hall. | |
| 1,684,582 | 9/28 | Hoagland | 285—177 X |
| 2,264,128 | 11/41 | Branch | 107—46 |
| 2,546,656 | 3/51 | Smith | 107—46 |
| 2,736,536 | 2/56 | Banowitz | 220—24 X |
| 2,868,145 | 1/59 | Brooke | 107—46 |

FOREIGN PATENTS

| 1,087,918 | 9/54 | France. |

ROBERT E. PULFREY, *Primary Examiner.*

JOSEPH D. BEIN, *Examiner.*